3,281,219
HYDRAZINATES AND METHOD OF PREPARING THE SAME
Edward Andrew Takacs, South Norwalk, Conn., assignor to American Cyanamid Company, Stamford, Conn., a corporation of Maine
No Drawing. Filed Aug. 1, 1962, Ser. No. 214,797
15 Claims. (Cl. 23—358)

This invention relates broadly to new and useful hydrazinates and to a method of preparing the same. More particularly the invention is concerned with the production of compounds represented by the general formula I $\quad [R]^+[B_{10}H_{13}\cdot N_2H_4]^-$ wherein $[R]^+$ represents the cation of a base having a dissociation constant $K_b$ in aqueous solution at 25° C. which is at least as high as that of hydrazine, the dissociation constant of which at 25° C. is $3\times10^{-6}$. Thus, $[R]^+$ in Formula I can be, for example, the cation of a base selected from the group consisting of the alkali metals (sodium, potassium, lithium, cesium and rubidium), hydrazine, guanidine, monoaminoguanidine, diaminoguanidine and triaminoguanidine. From the foregoing it will be seen that the present invention provides, for example, the alkali-metal, specifically sodium, potassium, etc., and the hydrazinium, guanidinium, monoaminoguanidinium, diaminoguanidinium and triaminoguanidinum salts of $[B_{10}H_{13}\cdot N_2H_4]^-$. The invention also provides a relatively rapid and simple method of making compounds of the kind embraced by Formula I.

A lengthy, tedious procedure for the preparation of $[B_{10}H_{13}\cdot ligand]^-$ compounds was known prior to the present invention [see, for example, R. H. Toeniskoetter, Doctoral Dissertation, St. Louis University (1958)]. However, to the best of my knowledge and belief the hydrazinates encompassed by Formula I were unknown prior to the present invention, as was also the applicant's method of preparing them.

It is a primary object of the present invention to provide a new class of chemical compounds.

Another object of the invention is to provide compounds which are useful in solid rocket propellant compositions and, also, in synthesizing other compounds which are useful in such propellant compositions, as well as for other purposes.

Still another object of the invention is to provide a rapid and relatively simple method of making the novel compounds of the invention.

Other objects of the invention will be apparent to those skilled in the art as the description of the invention proceeds.

The present invention is based on my discovery that compounds of the kind embraced by Formula I can be prepared by reacting together in an aqueous (i.e., water-containing) solution (1) a base having a dissociation constant $K_b$ in aqueous solution at 25° C. which is at least as high as that of hydrazine, (2) decaborane and (3) hydrazine. Taking triaminoguanidine (TAG) as illustrative of the base having the aforementioned dissociation constant, the reaction may conceivably proceed by the following two-step sequence illustrated in simplified form by the following equations:

II $\quad TAG + B_{10}H_{14} \xrightarrow{H_2O} TAGHB_{10}H_{13}$

III $\quad TAGHB_{10}H_{13} + N_2H_4 \xrightarrow{H_2O} TAGHB_{10}H_{13}\cdot N_2H_4$ Removal of a proton from decaborane by a strong base such, for example, as TAG results in the formation of the $B_{10}H_{13}$ anion. Once this anion is formed, it is reasonable to assume that it coordinates in situ with hydrazine to generate the $B_{10}H_{13}\cdot N_2H_4$ anion.

It was wholly unobvious and unexpected to find that a compound of the kind embraced by Formula I could be produced as briefly described above and more fully hereafter including the illustrative examples. This is because of the many different reactions that would be normally expected to occur in a system composed of decaborane, hydrazine and the above-defined base. That the reaction proceeds as it does presumably is because of the fact that dative-bond formation between the $B_{10}H_{13}$ anion and hydrazine is much faster than the rates of other possible competing reactions.

It is not essential that the reaction be carried out in a liquid reaction medium consisting solely of water. Usually the liquid reaction medium is constituted of at least about 75% by volume of water. Thus, the reaction can be carried out in, for instance, a mixture of water and an inert (substantially completely inert) organic solvent, e.g., benzene, toluene, xylene, etc. In such cases the preferred organic solvent is one which is capable of dissolving decaborane. When mixtures of water and an inert organic solvent are used as the liquid reaction medium, the proportions thereof may be widely varied, e.g., from 5% to 25% by volume of the organic solvent to from 95% to 75% parts by volume of water. Water alone is the preferred reaction medium.

The reaction is usually carried out at ambient temperature, more particularly at ordinary room temperature (20°–30° C.). Depending, for example, upon the particular strong base and the particular molar proportions of reactants employed, it can be carried out at higher or lower temperatures. Thus, the reaction can be effected at temperatures within the range of about 5° C. to about 80° C.

The molar proportions of the reactants may be considerably varied, but in general optimum yields are obtained when there is employed a relatively large molar excess of hydrazine. For example, when a reaction of equal molar quantities of triaminoguanidine, decaborane and hydrazine is carried out in a reaction medium consisting of approximately 10 parts by volume of benzene and 90 parts by volume of water, the compound, $$[TAGH]^+[B_{10}H_{13}\cdot N_2H_4]^-$$

is obtained in a yield of only about 5%. However, by using a large excess of hydrazine, the yield of the desired product is very substantially increased, for instance yields as high as 83% depending, for instance, upon the particular base employed and the particular conditions of reaction including the molar amount of hydrazine employed with respect to the other reactants. Thus, when the aminoguanidine or other strong base of the kind previously defined and the decaborane are used in approximately equal molar proportions (or with the one slightly, e.g., from 0.1 mole percent to 10 mole percent in excess of the other), then the hydrazine (a nucleophile) advantageously is used in an amount corresponding to from 50 mole percent to 3000 mole percent, preferably from 100 mole percent to 3000 mole percent, in excess of the amount of the decaborane (or of the other basic reactant) employed. The hydrazine reactant can be used, if desired, in even a larger molar excess, e.g., 4000 mole percent or more in excess of either of the other reactance, but ordinarily no particular advantages accrue therefrom.

The procedure is rapid and simple. In general, solid decaborane in finely divided state is merely added to an aqueous solution of (1) a strong base, e.g., guanidine, or a mono-, di- or a triaminoguanidine, and (2) excess hydrazine. Within minutes, the decaborane is completely dissolved. Removal of water and excess hydrazine leaves the crude product which, in the case of, for example, triaminoguanidine, is a white, semi-solid material which is purified by recrystallization.

The alkali-metal salts, $[M]^+[B_{10}H_{13} \cdot N_2H_4]^-$, where $[M]^+$ represents the cation of an alkali metal (sodium, potassium, lithium, rubidium or cesium) are prepared in essentially the same manner as described above. For instance, the potassium salt has been obtained in a yield of 83% of this method. It is a white, air-stable, crystalline solid which is purified by precipitation from methanol by the addition of benzene. Its infrared spectrum shows strong B–H and N–H absorption peaks. This compound has an autoignition temperature of 175°–176° C. and a zero percent point impact sensitivity of 50 cm.

By metathetical reactions various other salts can be prepared from the alkali-metal salt. Taking the potassium salt as illustrative of the alkali-metal salt employed as a reactant, such metathetical reactions can be illustrated by the following generalized equation:

V

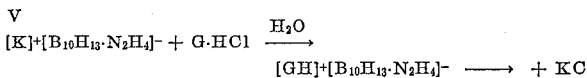

In order that those skilled in the art may better understand how the present invention can be carried into effect the following examples are given by way of illustration and not by way of limitation. All parts and percentages are by weight unless otherwise stated.

EXAMPLE 1

*Preparation of $[K]^+[B_{10}H_{13} \cdot N_2H_4]^-$*

Decaborane (4.89 g.; 0.04 mole) is added to a stirred solution of 95 ml. of 20% aqueous hydrazine and 40 ml. of 1 N aqueous potassium hydroxide (0.04 mole). After the decaborane dissolves (3–5 minutes), the colorless solution is evaporated to dryness to give an oily, semi-solid which is crystallized by the addition of 50 ml. of ethanol. A total of 6.43 g. (83% yield) of a white, air-stable, crystalline solid is collected by filtration. An attempt to obtain a second crop of product by boiling the filtrate to reduce its volume results in alcoholysis. The analytical sample of the product, $$[K]^+[B_{10}H_{13} \cdot N_2H_4]^-$$

is prepared by precipitating the compound from a methanol solution by addition of benzene. The analytical data are shown in Table I. Autoignition temperature: 175°–176° C.

EXAMPLE 2

Example 1 is followed exactly with the exception that an equivalent molar amount of aqueous sodium hydroxide is employed. Similar results are obtained.

TABLE I

[Analytical data for salts of $[B_{10}H_{13} \cdot N_2H_4]^-$]

| Salt of $[B_{10}H_{13} \cdot N_2H_4]^-$ | Percent C | | Percent H | | Percent N Dumas | | Percent N-N | | Percent B | |
|---|---|---|---|---|---|---|---|---|---|---|
| | Theory | Found | Theory | Found | Theory | Found | Theory | Found | Theory | Found |
| Potassium | 0.0 | 1.03 | 8.90 | 8.52 | 14.55 | 14.52 | 14.55 | 14.63 | 56.22 | 54.12 |
| Guanidinium | 5.63 | 5.91 | 10.86 | 10.76 | 32.82 | 31.44 | 13.13 | 13.28 | 50.59 | 46.50 |
| Monoaminoguanidinium | 5.26 | 5.98 | 10.59 | 10.21 | 36.79 | 36.74 | 24.53 | 24.60 | | |
| Diaminoguanidinium | 4.93 | 5.21 | 10.35 | 9.85 | 40.28 | 40.45 | 35.52 | 34.34 | 44.44 | 43.02 |
| Triaminoguanidinium | 4.64 | 5.15 | 10.14 | 9.67 | 43.35 | 42.77 | 43.34 | 42.95 | 41.86 | 41.31 |

In the foregoing equation, G represents one or the other of the following:

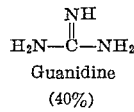

Guanidine
(40%)

VI 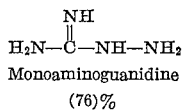

Monoaminoguanidine
(76)%

VII 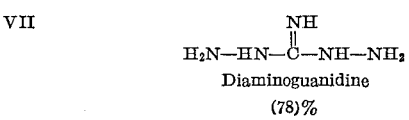

Diaminoguanidine
(78)%

VIII 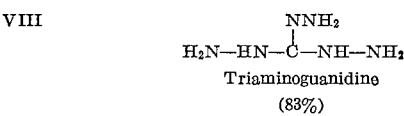

Triaminoguanidine
(83%)

In each of the foregoing reactions, the products precipitated from solution were obtained in the yields shown within the parentheses appearing below the name of the compound represented by G in Equation IV.

EXAMPLE 3

*Preparation of guanidinium and aminoguanidinium decaborohydride - 13 hydrazinates by metathetical reactions*

The guanidinium, monoaminoguanidinium, diaminoguanidinium and triaminoguanidinum salts are prepared by the reaction of their halides, more particularly chlorides or iodides, with the potassium salt, $$[K]^+[B_{10}H_{13} \cdot N_2H_4]^-$$

Table II summarizes the pertinent data for each of these reaction. The reaction with TAG·HCl is discussed in more detail to illustrate the procedure.

A solution of 1.44 g. (7.5 mmoles) of potassium decaboride-13 hydrazinate in 10 ml. of water is added to a solution of 1.06 g. (7.5 mmoles) of TAG·MCl in 20 ml. of water. Within several minutes the product, $[TAGH]^+[B_{10}H_{13} \cdot N_2H_4]^-$, separates from solution as a nicely crystalline material. Weight, 1.89 g.; yield, 98%. Recrystallization from warm water (50° C.) furnishes the analytical sample as white platelets. The thermogravimetric and differential thermal analyses show exotherms at 149° and 150° C., respectively. The autoignition temperature is 142°–145° C.

The monoamino- and diaminoguanidinium salts also separate from the reaction masses as nicely crystalline precipitates. The unsubstituted guanidinium salt however, is obtained only after the homogeneous reaction mass has been cooled and the reaction flask has been TABLE II
[Preparation of Guanidinium Salts of [$B_{10}H_{13}\cdot N_2H_4$]⁻]

| Reagents | | Product | Yield, mg. | Percent Yield | Recrystallizing Solvent |
|---|---|---|---|---|---|
| 480 mg. (5 mmoles) guanidinium chloride in 3 cc. H₂O. | 960 mg. (5 mmoles) K salt* in 3 cc. H₂O. | Guanidinium decaborohydride-13 hydrazinate. | 420 | 39.6 | Ethanol-benzene (about 1:4). |
| 550 mg. (5 mmoles) monoaminoguanidinium chloride in 3 cc. H₂O. | 960 mg. (5 mmoles) K salt* in 3 cc. H₂O. | Monoaminoguanidinium decaborohydride-13 hydrazinate. | 870 | 76.3 | Water. |
| 1.08 g. (5 mmoles) diaminoguanidinium iodide in 15 cc. H₂O. | 960 mg. (5 mmoles) K salt* in 10 cc. H₂O. | Diaminoguanidinium decaborohydride-13 hydrazinate. | 960 | 77.5 | Water. |
| 1.06 g. (7.5 mmoles) triaminoguanidinium chloride in 20 cc. H₂O. | 1.44 g. (7.5 mmoles) K salt* in 10 cc. H₂O. | Triaminoguanidinium decaborohydride-13 hydrazinate. | 1.89 g. | 98.0 | Water. |

*Note.—"K salt"=potassium decaborohydride-13 hydrazinate.

scratched to induce crystallization. Analytical data on these compounds are shown in Table I.

EXAMPLE 4

Solid decaborane (1.22 g., 10 mmoles) is added to a stirred solution of triaminoguanidine (1.04 g., 10 mmoles) in 17 ml. of a 54.4% aqueous solution of hydrazine (about 260 mmoles) and 33 ml. of water. Within two minutes the decaborane dissolves completely. The homogeneous, colorless solution is then evaporated to dryness under vacuum in order to remove the excess hydrazine. The oily, semi-solid residue which remains is crystallized by trituration with 100 ml. of water and cooling. Filtration furnishes 1.94 g. of product. The filtrate after being cooled overnight desposits an additional 50 mg. of material. A third crop of 160 mg. is obtained by concentrating the filtrate to one-half volume, cooling and filtering. Total yield: 2.15 g.; 83% of theory.

EXAMPLE 5

Solid decaborane (1.22 gm., 10 mmoles) is dissolved at room temperature (20°–30° C.) in 50 cc. of aqueous 20% hydrazine (about 300 mmoles hydrazine). The resulting clear solution is stirred for 24 hours and is then evaporated to dryness. The semi-solid thus obtained is extracted with 10 cc. methanol and to the methanolic solution thus obtained is added 40 cc. of benzene. The white, crystalline product which precipitates from solution is filtered off and dried in vacuo. Yield is 600 mgm. or 32.2% of theory. The infrared spectrum of this material is consistent with the proposed structure, $$[N_2H_5]^+[B_{10}H_{13}\cdot N_2H_4]^-$$

and is identical with the infrared spectrum of a sample prepared later by another route which is proven to be hydrazinium decaborohydride-13 hydrazinate by chemical means (i.e., metathetical reaction of this compound with triaminoguanidine hydrochloride to precipitate triaminoguanidinium decaborohydride-13 hydrazinate, which is filtered off, dried and compared with an authentic sample).

The reaction between decaborane and hydrazine in aqueous solution, using proportions such as will yield hydrazinium decaborohydride-13 hydrazinate, produces a considerable amount of gas; and no product ordinarily is deposited until all, or nearly all, of the solvent has been removed under reduced pressure. It it is desired to precipitate the reaction product and thus avoid its isolation by evaporation of the solvent, this can be done by, for example, carying out the reaction in a monohydric alcohol such, for instance, as a lower alkyl alcohol and specifically methyl alcohol. Such a procedure is shown in Example 6.

EXAMPLE 6

*Preparation of hydrazinium decaborohydride-13 hydrazinate*

Decaborane (1.22 g.; 10 mmoles) is dissolved in 10 ml. of methanol at 5° C. and to this solution is added, with stirring, 0.8 ml. of 97% hydrazine (20 mmoles). The resulting yellow solution slowly evolves hydrogen. After approximately one equivalent of hydrogen has been collected, a white solid comprising hydrazinium decaborohydride-13 hydrazinate precipitates from solution. Very little additional gas is produced after this. The reaction mass is then filtered, and the resulting solid is air dried. Yield, 940 mg.; approximately 50% of the theoretical. The product is recrystallized for analysis from methanol-benzene. The purified product has a melting point of 108°–110° C. The analytical results, given below, suggest that this compound may be solvated with some hydrazine.

*Analysis*—Calc'd. for $N_2H_5B_{10}H_{13}\cdot N_2H_4$: C, 0; H, 11.90; N, 30.06; B, 58.04. Found: C, 0.44; H, 11.01; N, 36.18; N-N, 36.44; B, 52.32.

EXAMPLE 7

Addition of the hydrazinium compound (126 mg.; 0.68 mmole) of Example 6 in 3 ml. of water to a solution of triaminoguanidine hydrochloride (95 mg.; 0.68 mmole) in 3 ml. of water gives an immediate precipitate of 110 mg. (63% yield) of $[TAGH]^+[B_{10}H_{13}\cdot N_2H_4]^-$ which is identified by comparison of its infrared spectrum with that of an authentic sample.

It will be understood, of course, by those skilled in the art that my invention is not limited only to the specific bases, i.e., [R]⁺ of Formula I employed in the foregoing examples solely by way of illustration. Thus, any other base having a dissociation constant $K_b$ in aqueous solution at 25° C. which is as high or higher than that of hydrazine can be used in place of the particular bases used in the examples. Illustrative examples of such bases used and their published dissociation constants $K_b$ at 25° C. are listed below:

Base: $K_b$ at 25° C.
- Methylamine _____ $5.0 \times 10^{-4}$
- Dimethylamine _____ $5.2 \times 10^{-4}$
- Diethylamine _____ $1.26 \times 10^{-3}$
- Triethylamine _____ $6.4 \times 10^{-4}$
- Methyldiethylamine _____ $2.7 \times 10^{-4}$
- n-propylamine _____ $4.7 \times 10^{-4}$
- Isopropylamine _____ $5.3 \times 10^{-4}$
- Dipropylamine _____ $1.02 \times 10^{-3}$
- sec.-butylamine _____ $4.4 \times 10^{-4}$
- Isobutylamine _____ $3.1 \times 10^{-4}$
- Diisobutylamine _____ $4.8 \times 10^{-4}$
- Isoamylamine _____ $5.0 \times 10^{-4}$
- Diisoamylamine _____ $9.6 \times 10^{-4}$
- Dimethylbenzylamine _____ $1.05 \times 10^{-5}$
- Diethylbenzylamine _____ $3.6 \times 10^{-5}$
- Piperidine _____ $1.6 \times 10^{-3}$ As has been mentioned hereinbefore, the salts of this invention (i.e., compounds of the kind embraced by Formula I) are useful as, for example, intermediates in chemical synthesis, and in rocket-propellant compositions. The following example illustrates one such composition.

*Example 8*

| | Percent |
|---|---|
| Triaminoguanidinium decaborohydride-13 hydrazinate | 81.4 |
| Poly(2-methyl-5-vinyltetrazole) | 13.0 |
| 1-methyl-5-(2-methoxyethyl)tetrazole | 5.6 |

The 1-methyl-5-(2-methoxyethyl)tetrazole functions primarily as a plasticizer for the poly(2-methyl-5-vinyltetrazole), and the plasticized poly(2-methyl-5-vinyltetrazole) functions primarily as a binder for the triaminoguanidinium decaborohydride-13 hydrazinate component of the composition. The theoretical performance (lb.-sec./lb.) of this composition is 286. Closed bomb end-burning samples show evidence of little or no gassing, and relatively smooth pressure-time traces are obtained. (From one such trace a burning rate of 3.6 i.p.s. at 1000 p.s.i.a. and an exponent of 0.55 were calculated.)

Sensitivity data on the propellant composition of this example are shown in Table III.

TABLE III

Sensitivity data
Autoignition temperature, ° C. _____ 134
Zero impact, cm./2 kg. _____ <4
Zero spark, joules _____ 0.136

I claim:
1. A compound of the group consisting of compounds represented by the general formula

$$[R]^+[B_{10}H_{13} \cdot N_2H_4]^-$$

wherein $[R]^+$ represents the cation of a base having a dissociation constant $K_b$ in aqueous solution at 25° C. which is at least as high as that of hydrazine.

2. A compound as in claim 1 wherein $[R]^+$ in the general formula represents the cation of a base selected from the group consisting of the alkali metals, hydrazine, guanidine, monoaminoguadidine, diaminoguanidine and triaminoguanidine.

3. A compound as in claim 2 wherein $[R]^+$ represents the cation of an alkali metal.

4. A compound as in claim 3 wherein the alkali metal represents potassium.

5. The hydrazinium salt of $[B_{10}H_{13} \cdot N_2H_4]^-$.

6. The guanidinium salt of $[B_{10}H_{13} \cdot N_2H_4]^-$.

7. The monoaminoguanidinium salt of $$[B_{10}H_{13} \cdot N_2H_4]^-$$

8. The diaminoguanidinium salt of $[B_{10}H_{13} \cdot N_2H_4]^-$.

9. The triaminoguanidinium salt of $[B_{10}H_{13} \cdot N_2H_4]^-$.

10. The method of preparing a compound of the group consisting of compounds represented by the general formula $$[R]^+[B_{10}H_{13} \cdot N_2H_4]^-$$

wherein $[R]^+$ represents the cation of a base having a dissociation constant $K_b$ in aqueous solution at 25° C. which is at least as high as that of hydrazine, said method comprising reacting together, in a liquid reaction medium comprising at least about 75% by volume of water, the following reactants: (1) a base having a dissociation constant $K_b$ in aqueous solution at 25° C. which is at least as high as that of hydrazine, (2) decaborane, and (3) hydrazine, said base and decaborane being used in approximately equal molar proportions, and said hydrazine being employed in a molar amount which is at least equal to the molar amount of the said base that is used; and isolating a compound of the group consisting of compounds represented by the above-given formula from the resulting reaction mass.

11. A method as in claim 10 wherein the liquid reaction medium consists solely of water.

12. A method as in claim 10 wherein the hydrazine is employed in a molar amount which is at least 50 mole percent in excess of the molar amount of the base used, the cation of said base being represented by $[R]^+$ in the general formula appearing in said claim 10.

13. A method as in claim 10 wherein the liquid reaction medium consists solely of water and the hydrazine is employed in a molar amount which is from 100 mole percent to 4000 mole percent in excess of the molar amount of the base used, the cation of said base being represented by $[R]^+$ in the formula appearing in said claim 10.

14. A method as in claim 10 wherein $[R]^+$ in the general formula represents the cation of a base having a dissociation constant $K_b$ in aqueous solution at 25° C. which is higher than that of hydrazine.

15. A method as in claim 10 wherein $[R]^+$ in the general formula represents the cation of a base selected from the group consisting of the alkali metals, hydrazine, guanidine, monoaminoguanidine, diaminoguanidine and triaminoguanidine.

References Cited by the Examiner

UNITED STATES PATENTS 3,033,644 5/1962 Ager _____ 23—190 X
3,135,580 6/1964 Ager _____ 23—14

OTHER REFERENCES

AEC Document, UCRL 4332, Apr. 19, 1954, p. 12.
Audrieth et al.: The Chemistry of Hydrazine, 1951, pp. 3 and 4.
Carpenter: Am. Rocket Soc. Journal, vol. 29, pp. 10 and 11, January 1959.
Emeleus et al.: J. Chem. Soc., pp. 840, 841, March 1951.
Hurd: Chemistry of the Hydrides, 1952, p. 74.
Schechter et al.: Boron Hydrides and Related Compounds, May 1954, pp. 69, 70 and 71.

OSCAR R. VERTIZ, *Primary Examiner.*

CARL D. QUARFORTH, J. D. VOIGHT, *Examiners.*

M. WEISSMAN, *Assistant Examiner.*